United States Patent
Khattab et al.

(10) Patent No.: US 12,185,109 B2
(45) Date of Patent: Dec. 31, 2024

(54) LOCATION-BASED SECURITY USING MULTI-POINT CRYPTOGRAPHY

(71) Applicant: QATAR UNIVERSITY, Doha (QA)

(72) Inventors: Tamer Khattab, Doha (QA); Mohammed Hafez, Lutz, FL (US); Abdullatif Shikfa, Doha (QA); Huseyin Arslan, Tampa, FL (US)

(73) Assignee: QATAR UNIVERSITY, Doha (QA)

( * ) Notice: Subject to any disclaimer, the term of this patent is extended or adjusted under 35 U.S.C. 154(b) by 180 days.

(21) Appl. No.: 17/696,792

(22) Filed: Mar. 16, 2022

(65) Prior Publication Data

US 2023/0319572 A1    Oct. 5, 2023

(51) Int. Cl.
| | | |
|---|---|---|
| *H04W 12/64* | (2021.01) | |
| *G06F 17/12* | (2006.01) | |
| *H04W 4/029* | (2018.01) | |
| *H04W 12/033* | (2021.01) | |
| *H04W 12/104* | (2021.01) | |
| *H04W 12/122* | (2021.01) | |
| *H04W 12/63* | (2021.01) | |

(52) U.S. Cl.
CPC .......... *H04W 12/122* (2021.01); *G06F 17/12* (2013.01); *H04W 4/029* (2018.02); *H04W 12/033* (2021.01); *H04W 12/104* (2021.01); *H04W 12/63* (2021.01)

(58) Field of Classification Search
None
See application file for complete search history.

(56) References Cited

U.S. PATENT DOCUMENTS

| | | | | |
|---|---|---|---|---|
| 2009/0290484 | A1* | 11/2009 | Painchault | H04L 1/0041 370/216 |
| 2010/0042824 | A1* | 2/2010 | Lee | H04L 9/0894 713/168 |
| 2018/0109573 | A1* | 4/2018 | Munger | H04L 45/24 |
| 2019/0080342 | A1* | 3/2019 | Andon | A63F 13/69 |
| 2020/0100048 | A1* | 3/2020 | Wu | H04W 4/02 |
| 2021/0297199 | A1* | 9/2021 | Miao | H04W 72/20 |
| 2023/0319572 | A1* | 10/2023 | Khattab | H04W 4/029 726/22 |

FOREIGN PATENT DOCUMENTS

CN     105682035 A  *  6/2016  ............ H04W 4/025

OTHER PUBLICATIONS

Thomas M. Cover et al., "Elements of Information Theory", Wiley, Second Edition, 774 pages.

(Continued)

*Primary Examiner* — Christopher B Robinson
(74) *Attorney, Agent, or Firm* — SQUIRE PATTON BOGGS (US) LLP (57) ABSTRACT

Systems and methods may provide location-based security using multi-point cryptography. The method may include receiving, by a controller, an original message for secure delivery to a mobile terminal. The method may also include generating, by the controller, a plurality of messages to be delivered to the mobile terminal using geographic diversity. The method may further include sending, by the controller, the plurality of messages to geographically diverse transmitters for transmission to the mobile terminal.

18 Claims, 6 Drawing Sheets

(56) References Cited

OTHER PUBLICATIONS

Xiangyun Zhou et al., "Physical Layer Security in Wireless Communications", Wireless Networks and Mobile Communications Series, CRC Press, Taylor and Francis Group, 308 pages.
Joao Barros et al., "Secrecy Capacity of Wireless Channels", ISIT 2006, Seattle, USA, Jul. 9-14, 2006, 5 pages.
Yulong Zou et al., "A Survey on Wireless Security: Technical Challenges, Recent Advances, and Future Trends", Contributed Paper, Proceedings of the IEEEE, vol. 104, No. 9, Sep. 2016, 39 pages.
Xiaoming Chen et al., "A Survey on Multiple-Antenna Techniques for Physical Layer Security", IEEE Communications Surveys & Tutorials, vol. 19, No. 2, Second Quarter 2017, 27 pages.
K. Sivakumar et al., "A Five-Level Inverter Scheme for a Four-Pole Induction Motor Drive by Feeding the Identical Voltage-Profile Windings From Both Sides", IEEE Transactions on Industrial Electronics, vol. 57, No. 8, Aug. 2010, DOI: 10.1109/TIE.2009.2026763, 9 pages.
Satashu Goel et al., "Guaranteeing Secrecy Using Artificial Noise", IEEE Transactions on Wireless Communications, vol. 7, No. 6, Jun. 2008, DOI: 10.1109/TWC.2008.060848, 10 pages.
Wonil Roh et al., "Millimeter-Wave Beamforming as an Enabling Technology for 5G Cellular Communications: Theoretical Feasibility and Prototype Results", 5G Wireless Communication Systems: Prospects and Challenges, IEEE Communications Magazine, Feb. 2014, 8 pages.
Michael P. Daly et al., "Directional Modulation and Coding in Arrays", AP-S/URSI 2011, 4 pages.
Nachiappan Valliappan et al., "Antenna Subset Modulation for Secure Millimeter-Wave Wireless Communication", IEEE Transactions on Communications, vol. 61, No. 8, Aug. 2013, DOI: 10.1109/TCOMM.2013.061013.120459, 15 pages.
Osama N. Alrabadi et al., "Directional Space-Time Modulation: A Novel Approach for Secured Wireless Communication", IEEE ICC 2012—Signal Processing for Communications Symposium, 5 pages.
Yuan Ding et al., "A Vector Approach for the Analysis and Synthesis of Directional Modulation Transmitters", IEEE Transactions on Antennas and Propagation, vol. 62, No. 1, Jan. 2014, DOI: 10.1109/TAP.2013.2287001, 10 pages.
Y. Ding et al., "MIMO-Inspired Synthesis of Directional Modulation Sytems", IEEE Antennas and Wireless Propagation Letters, vol. 15, 2016, DOI: 10.1109/LAWP.2015.2459752, 5 pages.
Mohammed Hafez et al., "On Directional Modulation: An Analysis of Transmission Scheme with Multiple Directions", IEEE ICC 2015—Workshop on Wireless Physical Layer Security, 5 pages.
Matthew Edman et al., "On the Security of Key Extraction From Measuring Physical Quantities", IEEE Transactions on Information Forensics and Security, vol. 11, No. 8, Aug. 2016, DOI: 10.1109/TIFS.2016.2543687, 11 pages.
S. Mohammad Paknahad et al., "User-Friendly Visual Secret Sharing Based on Random Grids", SPIS2015, Dec. 16-17, 2015, Amirkabir University of Technology, Tehran, Iran, 5 pages.
Mohammad Ehdaie et al., "A Novel Secret Sharing Scheme from Audio Perspective", 2008 International Symposium on Telecommunications, 6 pages.
Yuto Miura et al., "Security of (n,n)-Threshold Audio Secret Sharing Schemes Encrypting Audio Secrets", 2016 IEEE Statistical Signal Processing Workshop (SSP), 5 pages.
B.S. Umesh et al., "Multilevel Inverter Scheme for Performance Improvement of Pole-Phase-Modulated Multiphase Induction Motor Drive", IEEE Transactions on Industrial Electronics, vol. 63, No. 4, Apr. 2016, DOI: 10.1109/TIE.2015.2506623, 8 pages.
Prof. G.H. Rawcliffe et al., "A 2:1 Pole-Changing Induction Motor of Improved Performance", The Proceedings of the Institution of Electrical Engineers, Paper No. 2399 U, vol. 104, Part A, No. 18, Dec. 1957, 4 pages.
Prof. G.H. Rawcliffe et al., "An Asymmetrical Induction-Motor Winding for 6:3:2:1 Speed Ratios", Paper No. 2180 U, Dec. 1956, 13 pages.
B. Prathap Reddy et al., "A Five Speed 45-Phase Induction Motor Drive with Pole Phase Modulation for Electric Vehicles", 6 pages.
Leonard M. Melcescu et al., "A New 4/6 Pole-Changing Double Layer Winding for Three Phase Electrical Machines", XIX International Conference on Electrical Machines—ICEM 2010, Rome, 6 pages.
B. Prathap Reddy et al., "A Single DC Source-Based Three-Level Inverter Topology for a Four-Pole Open-End Winding Nine-Phase PPMIM Drives", IEEE Transactions on Industrial Electronics, vol. 68, No. 4, Apr. 2021, DOI: 10.1109/TIE.2020.2977570,10 pages.
B Prathap Reddy et al., "Multiayer Fractional Slot Pole-Phase Modulated Induction Motor Drives for Traction Applications", IEEE Transactions on Industrial Electronics, vol. 67, No. 11, Nov. 2020, DOI: 10.1109/TIE.2019.2958287, 8 pages.
Prof. G.H. Rawcliffe et al., "The Development of a New 3:1 Pole-Changing Motor", Paper No. 1958 U, Dec. 1955, 11 pages.
Baoming Ge et al., "Winding Design, Modeling, and Control for Pole-Phase Modulation Induction Motors", IEEE Transactions on Magnetics, vol. 49, No. 2, Feb. 2013, DOI: 10.1109/TMAG.2012.2208652, 14 pages.

* cited by examiner

LOCATION-BASED SECURITY USING MULTI-POINT CRYPTOGRAPHY

FIELD

Some example embodiments may generally relate to location-based security systems, devices, and methods. Some example embodiments may relate to location-based security using multi-point cryptography.

BACKGROUND

Communication security has been of interest since ancient times. Julius Caesar used a simple substitution cipher. The Spartans used a scytale, which was a transposition cypher. Toward the dawn of the computer age, the Data Encryption Standard (DES) was developed as a symmetric key algorithm for encryption of electronic data. In the Internet age, the Advanced Encryption Standard (AES) was developed to replace DES.

Nevertheless, cipher-based methods of cryptography are inherently breakable. While symmetric algorithms with sufficiently large keys are expected to remain secure, it is expected that quantum computing techniques will dramatically reduce the time needed to break asymmetrical algorithms, such as Rivest-Shamir-Adleman (RSA) or elliptic curve digital signature algorithm (ECDSA), such that they may become relatively insecure.

Symmetric algorithms may rely on a secure channel by which to provide a secret key. Such an approach may be effective in some applications, but may be ineffective in cases where such a secure channel cannot be provided. Likewise, other relatively strong techniques, such as a one-time pad, may not be practical for implementation in a massively multi-user scenario.

SUMMARY

An embodiment may be directed to a controller that may include at least one processor and at least one memory including computer program code. The at least one memory and the computer program code may be configured to, with the at least one processor, cause the controller to receive an original message for secure delivery to a mobile terminal. The at least one memory and the computer program code may also be configured to, with the at least one processor, cause the controller to generate a plurality of messages to be delivered to the mobile terminal using geographic diversity. The at least one memory and the computer program code may further be configured to, with the at least one processor, cause the controller to send the plurality of messages to geographically diverse transmitters for transmission to the mobile terminal.

An embodiment may be directed to a method. The method may include receiving, by a controller, an original message for secure delivery to a mobile terminal. The method may also include generating, by the controller, a plurality of messages to be delivered to the mobile terminal using geographic diversity. The method may further include sending, by the controller, the plurality of messages to geographically diverse transmitters for transmission to the mobile terminal.

An embodiment may be directed to an apparatus. The apparatus may include means for receiving an original message for secure delivery to a mobile terminal. The apparatus may also include means for generating a plurality of messages to be delivered to the mobile terminal using geographic diversity. The apparatus may further include means for sending the plurality of messages to geographically diverse transmitters for transmission to the mobile terminal.

An embodiment may be directed to a system. The system may include a controller configured to receive an original message for secure delivery to a mobile terminal, generate a plurality of messages to be delivered to the mobile terminal using geographic diversity, and send the plurality of messages to geographically diverse transmitters for transmission to the mobile terminal. The system may also include the geographically diverse transmitters configured to transmit a respective message of the plurality of messages to the mobile terminal.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of location-based security using multi-point cryptography, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments enable collaborative location-based secure communication while maintaining information secrecy with respect to the collaborating partners. Methods and apparatuses can combine techniques of location-based secure modulation and cryptographic based secret sharing into one physical-layer-based secure communication method that may guarantee that information is hidden everywhere spatially except at a predefined intended location of a legitimate receiver.

Certain embodiments may rely on secret sharing, a cryptographic mechanism, which can disguise the secret message into multiple pieces of random information. A subset of these pieces can then be distributed over multiple sources in order to be transmitted. For the secret message to be reconstructed, the receiver can collect all the transmitted pieces of information. By directionally modulating the information pieces towards a predefined location, certain embodiments can provide a location-based secure communication channel between legitimate users.

Certain embodiments may provide multiple advantages over pre-existing cryptographic communication system and may provide high secrecy performance without increasing the complexity or cost of the receiving device. First, the collaborative location-based secure communications system may not require prior knowledge of some information, which may not be practically available. Second, the system may not sacrifice the performance of the main communication. Third, and contrary to existing location-based secrecy methods where the physical layer relies on using cooperating nodes that are trusted parties so that the nodes have full access to the information, the certain embodiments do not require cooperating nodes that are trusted parties and have full access to the original message. Fourth, a collaborative location-based secure communications system may provide a location-based secure communication link. Fifth, each secret message can be mapped to different sets of arbitrary data providing dynamic mapping. Sixth, key sharing and key mismatching may be avoided as the encryption can occur on the transmission side.

Using a transmitter side cryptographic approach that enhances the secrecy performance of directional modulation (DM) schemes by disguising the secret message into a set of random pieces of information may allow for the sharing of information without revealing the secret message to unauthorized entities along the communication path. Further, certain embodiments described herein can be used for wireless powering at certain desired device locations while maintaining the power level at all other locations below safety thresholds. Certain embodiments may be embedded within wireless communication to provide high secrecy performance without increasing the complexity or cost of the receiving device. Further, certain embodiments may provide lower cost and efficient secrecy for applications such as, for example, constellation-based telecommunication satellites, high altitude unmanned aerial vehicles, global Internet service, audio-based systems, military communication where secrecy of the locations of friendly troops is valuable and locations of hostile troops may be unknown, and other wave-based communications.

In various embodiments, the collaborative location-based secure communication system can encrypt a secret message by splitting the message into a plurality of pieces of random information, which can also be referred to as shares, by a transmitting device. A destination receiving device may be identified to which the secret message is to be transmitted. A plurality of sources may be identified that are capable of transmitting a share from the transmitting device/source to the location of the destination receiving device. The transmitting device can send a share to each source in the plurality of sources and each source can then directionally modulate the received share to the predefined location of the destination receiving device. Once the shares are all received by the destination receiving device, the receiving device can correctly decode and recover the secret message. A benefit of the collaborative location-based secure communication system may be that any receiver (e.g., eavesdropper) not in the predefined location and/or along the transmission of the shares is unable to decode and recover the secret message as the receiver is unable to collect all the shares of the secret message.

New radio networks may serve an enormous number of devices. Thus, a correspondingly huge amount of information may be exchanged over-the-air. With public accessibility to the wireless environment, this information may be susceptible to different types of attacks from adversaries. Physical layer security (PLS) may serve as an additional layer of protection beyond existing cryptographic algorithms.

Multiple-antenna systems can extend the available degrees of freedom. In turn, these degrees of freedom can provide extra resources that can be used for providing security. Generalized-singular-value decomposition (GSVD) may help to achieve the secrecy capacity with the condition of the knowledge of the channel state information (CSI) of all the nodes in the network including the eavesdropper. Artificial noise (AN) addition may provide a realistic solution when the CSI of the eavesdropper cannot be acquired.

The expansion of the spectrum, and the emergence of mm-wave technology, opened the way for array-based approaches. Instead of conventional beamforming, directional modulation (DM) may provide a more secure option. Many single-direction transmission approaches may suffer from the man-in-the-middle problem. Multi-direction transmission is an alternative to single-direction transmission and may only depend on multiuser interference. Such approaches may be inefficient under particular scenarios, such as in a single-user system.

On the other hand, cryptography has been considered as a separate approach for securing the transferred information. One approach encrypts the secret message in a set of N randomly selected points, in a way that the message can only be retrieved by collecting at least K points out of the original N points. This approach can further be used to encrypt acoustical and visual media. This approach was not used for wireless transmission from a PLS point of view.

Figure 1:
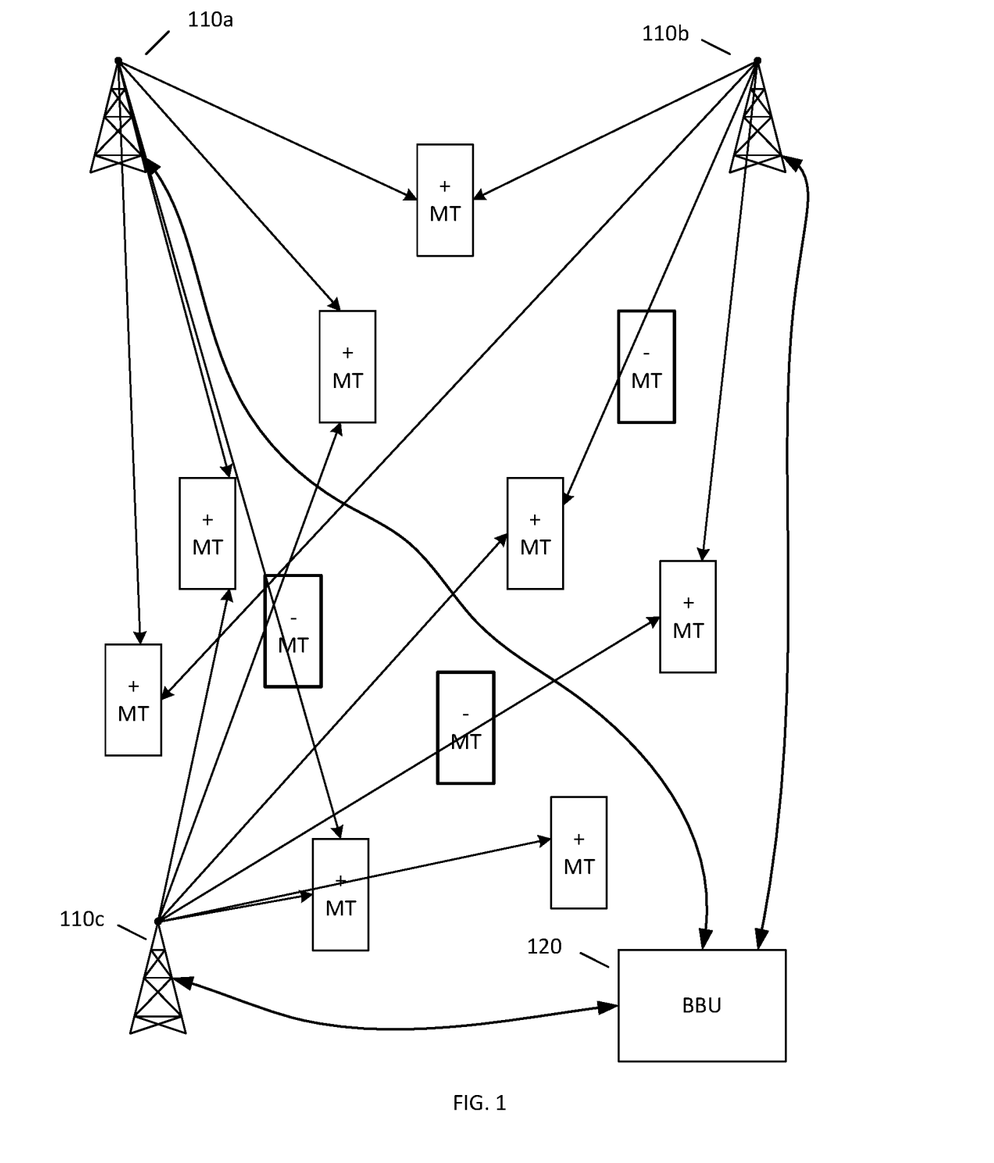
FIG. 1 illustrates a system according to certain embodiments.

FIG. 1 illustrates a system according to certain embodiments. As depicted in FIG. 1, the system can include multiple serving transmission points 110a, 110b, 110c, and a set of trusted users having trusted mobile terminals (+MT) with known locations, as well as a set of untrusted users having untrusted mobile terminals (−MT) with unknown locations.

A set of random information can be constructed using an original secret message at a central processing entity, such as baseband unit (BBU) 120 in centralized radio access network (C-RAN) architecture. The BBU 120 can have a connection, such as a fiber optic connection, to each of transmission points 110a, 110b, and 110c. Each random member of the constructed random information set can be sent to a corresponding transmission point 110a, 110b, or 110c, each of which can be a remote radio head (RRH).

Each transmission point can directionally modulate the information toward the location of the desired receivers. For example, the information can be transmitted on a narrow beam toward the location of a desired receiver.

By collecting all the information pieces directed to a given MT's location, the receiver of the MT may be able to retrieve the original message. At any other location, the amount of information pieces may not be sufficient to retrieve the original message. Thus, even though an untrusted mobile terminal may be able to intercept a communication between a remote radio head and a trusted mobile terminal, it may be impossible for a single untrusted MT to intercept the communications from multiple RRHs. Even using multiple untrusted MTs, it may be difficult to intercept a sufficient number of the communications from the various RRHs.

Further enhancement to the secrecy level can be done using the knowledge of channel state information if available (e.g. via channel estimation methods). Certain embodiments may provide dynamic mapping. For example, each secret message can be mapped to different sets of arbitrary data. Certain embodiments may avoid a man-in-the-middle problem of a directional modulation scheme, as it can transmit some random information instead of the actual message.

Certain embodiments can use a (B,L)-threshold scheme, where (B≤L), and B,L are positive integers. A secret X can be retrieved only when at least B participants out of the available L were able to collaborate with their respective shares. This scheme can be provided as a way to securely transfer visual and acoustical content. A dealer D, which has the knowledge about the secret message X, can selects (B−1) random elements denoted $a=[a_0, a_1, \ldots, a_{(B-1)}]T$, while $a_0=X$. D can use a as the coefficients to generate a polynomial of the order B. Then, D can compute the L shares, which are the values of the generated polynomial, as follows $$y_i = \sum_{j=0}^{B-1} a_j v_i^j \bmod p \, \forall \, i \in \{1, 2, \ldots, L\}, \quad \text{Equation (1)}$$

where each $v_i$ is a point on the polynomial and randomly selected, and p>L is a prime to ensure that all operations are performed in a finite field. If the participants are able to combine at least B shares, the secret X can be retrieved by solving a system of linear equations or using Lagrange interpolation.

The approach of solving a system of linear equations can solve a system of linear equations according to $a=V^{-1}y$, where $y=[y_1, y_2, \ldots, y_B]^T$ and $V=\{v_i^j\}_{B \times B}$ is Vandermonde matrix having a determinant given by the following:

$$\det V = \Pi_{1 \leq i < j \leq B}(v_i - v_j) \bmod p. \quad \text{Equation (2).}$$

Because all v's are distinct, there are no zero terms in the product, and hence, det V≠0. Therefore, the system may have a unique solution.

The approach using Lagrange interpolation can solve the following:

$$X = \sum_{i=1}^{B} y_i \cdot c_i, \quad \text{Equation (3)}$$

$$c_i = \prod_{\substack{j=1 \\ j \neq i}}^{B} \frac{v_j}{v_i - v_j}. \quad \text{Equation (4)}$$

The value of $c_i$, $\forall i \in \{1\}$ can be precomputed, and considered publicly accessible. For the case of (B=L), the secret retrieval can be reduced to:

$$X = \sum_{i=1}^{B} y_i. \quad \text{Equation (5)}$$

The adopted system can include B transmission points (TPs). Each TP can be equipped with a uniform linear array (ULA) of length N. The system can serve M users. Each user can be equipped with a single omnidirectional antenna. For analysis purposes, all eavesdroppers in the system may be passive, which may prevent the system from knowing the channel state information (CSI) of the eavesdropper. The received signal at any location may be given as follows:

$$r(k) = \sum_{i=1}^{B} g^{(i)}(k - \tau_i) s^{(i)}(\theta, k) + z(k) = \quad \text{Equation (6)}$$
$$\sum_{i=1}^{B} g^{(i)}(k - \tau_i) h^H(\theta^{(i)}) w^{(i)}(k) + z(k),$$

where $g^{(i)}$ is the channel gain coefficient associated with the $i^{th}$ base station, and $\tau_i$ is the corresponding delay, $s^{(i)}$ is the transmitted signal, and z(k) is additive Gauassian noise at the receiver. For simplicity, full synchronization can be assumed, such that the signals of all TPs arrive at the appropriate time at the desired location, namely $\tau_i = \tau \forall i$. Then, the weights vector of the $i^{th}$ TP can be given as $w^{(i)}(k) = H(H^H H)^{-1} y^{(i)}(k)$, where $y^{(i)}(k) = [y_1^{(i)}(k), y_2^{(i)}(k), \ldots, y_M^{(i)}(k)]'$ are the shares of the M legitimate users, given to the $i^{th}$ TP.

With such a structure of weights, the signal received at the location of any of the M users can be described as follows:

$$r_m(k) = \sum_{i=1}^{B} g^{(i)}(k) h^H(\theta^{(i)}) H(H^H H)^{-1} y^{(i)}(k) + z(k) = \qquad \text{Equation (7)}$$
$$\sum_{i=1}^{B} g^{(i)}(k) y_M^{(i)}(k) + z(k) = x_m(k) + z(k).$$

For any other location, the receiver may be unable to retrieve the message, due to the directional modulation effect and the secret sharing effect.

Beamforming and multipoint transmission are technologies that may be used with radio systems, such as Fifth Generation (5G) and Sixth Generation (6G), which consider information security as a major aspect. Certain embodiments can leverage 5G/6G technologies to provide a high level of information security solely based on a location of a legitimate receiver.

The provided method and apparatus can be used for battlefield military communication secrecy based on knowing locations of friendly troops and locations of hostile troops.

Although certain embodiments are related to radio waves, the same principles can be used in audio based systems where using multiple speakers can guarantee delivery of audible sound waves in certain location while it will not be audible in any other locations.

Certain embodiments can be used for wireless powering at certain desired device locations while maintaining the power level at all other locations below safety thresholds.

In general, any wave-based mechanism (radio, light, sound, or the like) where several sources collaborate to make sure the waves combine into a usable or desired version at a particular location while it scatters, cancels, or diffuses at all other locations, can benefit from certain embodiments, with appropriate adaptation to the nature and characteristics of the waves and wave sources.

A system implementing certain embodiments was simulated over a 50 by 50 grid with different number of sources also referred to as base stations (BSs). The system in the simulation served 5 users randomly located on the grid. The secrets were quaternary phase shift keyed (QPSK) symbols. The channel gains were simulated for two cases: free space fading and frequency selective channels.

A first observation from the simulation was that the data was decodable within a very limited area around a location of a desired user. Outside the area, the received symbols were almost random. A second observation from the simulation was that the received signal over the whole grid was almost uncorrelated with the shared secret, except for the area around the desired location. Thus, the signal received outside the desired location did not have any form of linear relationship with the shared secret message.

Certain embodiments relate to a generalization for a pole phase modulated induction motor drive, which may achieve uniform pole formation.

The simulation results were obtained for a case with two sources of data and a case with four sources of data. With four sources of data, the area where the message is decodable became much smaller. Thus, for users with higher levels of needed security, the use of more data sources may provide higher levels of security.

Thus, certain embodiments may provide a secure approach for directional modulation schemes, which provides a location-based secure communication channel. The approach depends on the secret sharing concept, which can disguise the secret message into fragments of random information. Certain embodiments are applicable to various system structures. Simulation results demonstrate that certain embodiments may be capable of enhancing the secrecy performance of directional modulation schemes, and may be able to reduce the area where the message is decodable. Certain embodiments can provide a dynamic environment to eliminate any traceable steps that could lead to the shared secret. Certain embodiments may provide secrecy for different network implementation with different number of users and sources. Moreover, certain embodiments can also work for different channel conditions.

Certain embodiments may use an arbitrary number of antenna array elements. The number of antenna array elements may not directly affect the secrecy rate or outage performance. Increasing the number of the elements may results in the ability to have a narrower information beam, which may reduce the area where transmitted shares are accessible, and consequently the area where the secret is detectable. Moreover, increasing the number of elements may allow the system to serve a larger number of users.

Certain embodiments may rely on coordinated multipoint (COMP) transmission and/or networks with untrusted relays. For example, while a COMP based structure is an example system structure, other structures can also be used. For instance, the structure can be a single base station in a multi-tap environment, where the signal can reach the user through different communication paths, each of them carrying a different fragment of the secret. Another system would be a relay-based network, in which the untrusted relay problem may be addressed by limiting the availability of information at the relays to only the non-reconstructable fragments.

Figure 2:
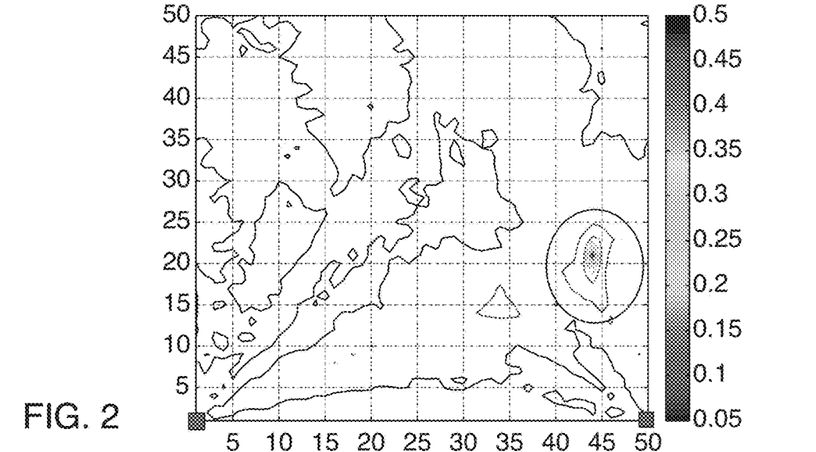
FIG. 2 illustrates a grid showing bit-error-rate for data of a user at a location that receives a shared secret from two sources, according to certain embodiments.

FIG. 2 illustrates bit-error-rate (BER) values over the grid for a given user location in the above-described simulation. The grid shows data for a user at a location that receives a shared secret from two sources. The data may be transmitted using a collaborative location-based secure communication system similar to the one of FIG. 1. The grid is a 50 by 50 grid with a pair of sources located at the bottom corners of the grid (depicted as squares) and the receiving user is located at 44,22. The area where the data is decodable is located within the circle, which includes the user within the circle. The channel gains are simulated for two cases, namely, free space fading and frequency selective channels. The communication system may serve five users randomly located over the grid. Notably, the data is decodable in a very limited area around the location of the desired user, while outside that area the received symbols are almost random.

Figure 3:
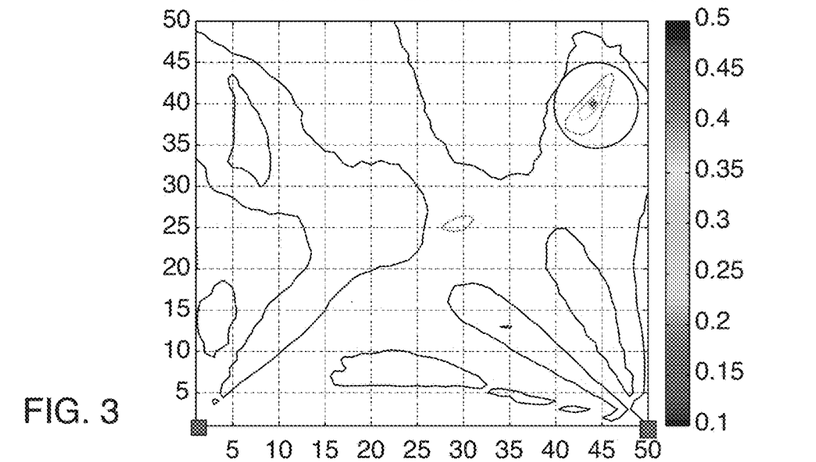
FIG. 3 illustrates a magnitude of correlation coefficient for the data of the user at the location of FIG. 2 that receives the shared secret from two sources, according to certain embodiments.

The magnitude of the correlation coefficient between the received signal and the shared secret for the location of FIG. 2 is illustrated in FIG. 3. As illustrated, the received signal over the whole grid is almost uncorrelated with the shared secret, except for the area around the desired location. Accordingly, the signal received outside the desired location does not have any form of linear relationship with the shared secret message. The correlation coefficient may be determined by $$\rho = \left| \frac{\text{Cov}(r(k), S_m(k))}{\text{var}(r(k))\text{var}(S_m(k))} \right|.$$

Figure 4:
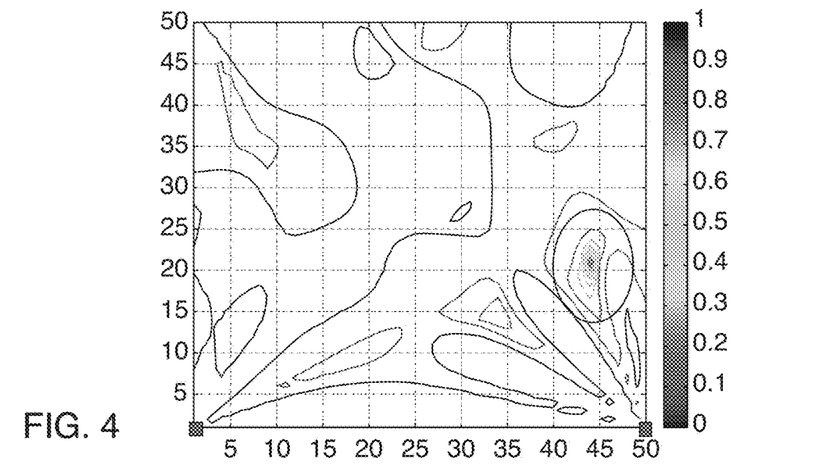
FIG. 4 illustrates a grid showing the bit-error-rate for data of a user at a different location that receives a shared secret from two sources, according to certain embodiments.

FIG. 4 illustrates bit-error-rate (BER) values over the grid for a given user location. The grid shows data for a user at a location that receives a shared secret from two sources. The data may be transmitted using a collaborative location-based secure communication system similar to the one of FIG. 2. The grid is a 50 by 50 grid with a pair of sources located at the bottom corners of the grid (depicted as squares) and the receiving user is located at 44,40. The area where the data is decodable is located within the circle, which includes the user within the circle. The channel gains are simulated for two cases, namely, free space fading and frequency selective channels. The communication system may serve five users randomly located over the grid. Notably, the data is decodable in a very limited area around the location of the desired user, while outside that area the received symbols are almost random.

Figure 5:
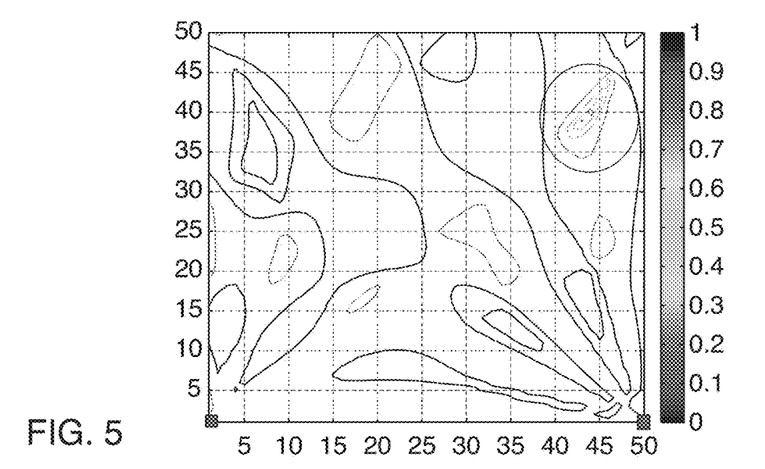
FIG. 5 illustrates a magnitude of correlation coefficient for the data of the user at the location of FIG. 4 that receives the shared secret from two sources, according to certain embodiments.

The magnitude of the correlation coefficient between the received signal and the shared secret for the location of FIG. 4 is illustrated in FIG. 5. As illustrated, the received signal over the whole grid is almost uncorrelated with the shared secret, except for the area around the desired location. Accordingly, the signal received outside the desired location does not have any form of linear relationship with the shared secret message.

Figure 6:
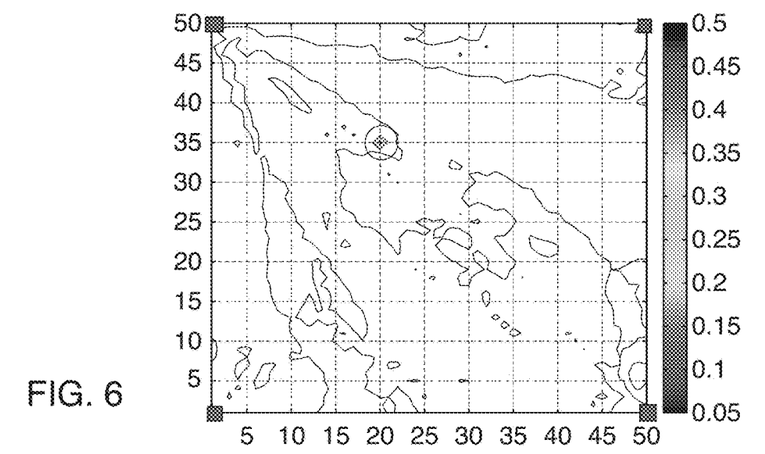
FIG. 6 illustrates a grid showing the bit-error-rate for data of a user at a location that receives a shared secret from four sources, according to certain embodiments.

FIG. 6 illustrates bit-error-rate (BER) values over the grid for a given user location. The grid shows data for a user at a location that receives a shared secret from four sources. The data may be transmitted using a collaborative location-based secure communication system similar to the one of FIG. 2. The grid is a 50 by 50 grid with a pair of sources located at the bottom corners of the grid and another pair of sources located at the top corners (depicted as squares) and the receiving user is located at 20,35. The area where the data is decodable is located within the circle, which includes the user within the circle. The channel gains are simulated for two cases, namely, free space fading and frequency selective channels. The communication system may serve five users randomly located over the grid. Notably, the data is decodable in a very limited area around the location of the desired user, while outside that area the received symbols are almost random.

Figure 7:
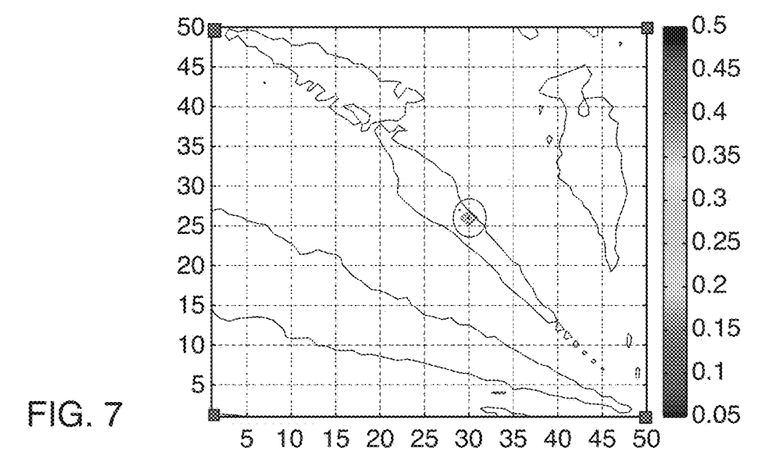
FIG. 7 illustrates a magnitude of correlation coefficient for the data of the user at the location of FIG. 6 that receives the shared secret from four sources, according to certain embodiments.

The magnitude of the correlation coefficient between the received signal and the shared secret for the location of FIG. 6 is illustrated in FIG. 7. As illustrated, the received signal over the whole grid is almost uncorrelated with the shared secret, except for the area around the desired location. Accordingly, the signal received outside the desired location does not have any form of linear relationship with the shared secret message. Notably, compared to the systems with two sources, for example the systems depicted in FIGS. 2-5, the area where the message is decodable becomes much smaller. Accordingly, sources can be added or subtracted to provide a flexible security level based on resources implemented, receiving location size, and the secrecy requirements of each user.

Figure 8:
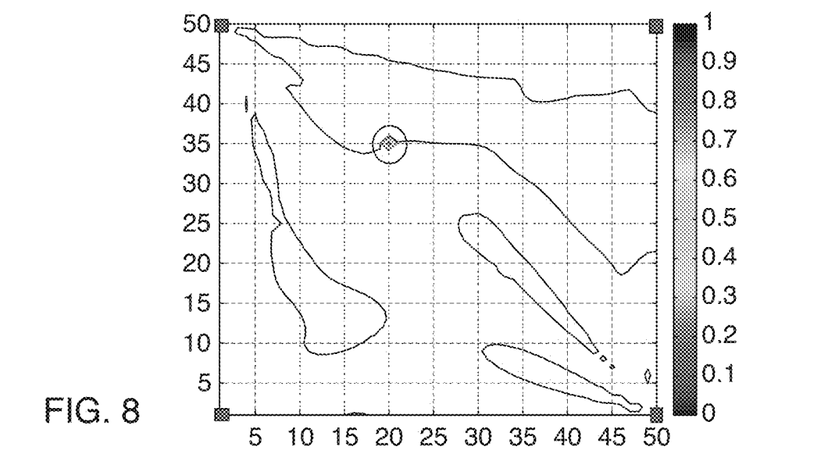
FIG. 8 illustrates a grid showing the bit-error-rate for data of a user at a different location that receives a shared secret from four sources, according to certain embodiments.

FIG. 8 illustrates bit-error-rate (BER) values over the grid for a given user location. The grid shows data for a user at a location that receives a shared secret from four sources. The data may be transmitted using a collaborative location-based secure communication system similar to the one of FIG. 6. The grid is a 50 by 50 grid with a pair of sources located at the bottom corners of the grid and another pair of sources located at the top corners (depicted as squares) and the receiving user is located at 30,26. The area where the data is decodable is located within the black circle, which includes the user within the circle. The channel gains are simulated for two cases, namely, free space fading and frequency selective channels. The communication system may serve five users randomly located over the grid. Notably, the data is decodable in a very limited area around the location of the desired user, while outside that area the received symbols are almost random.

Figure 9:
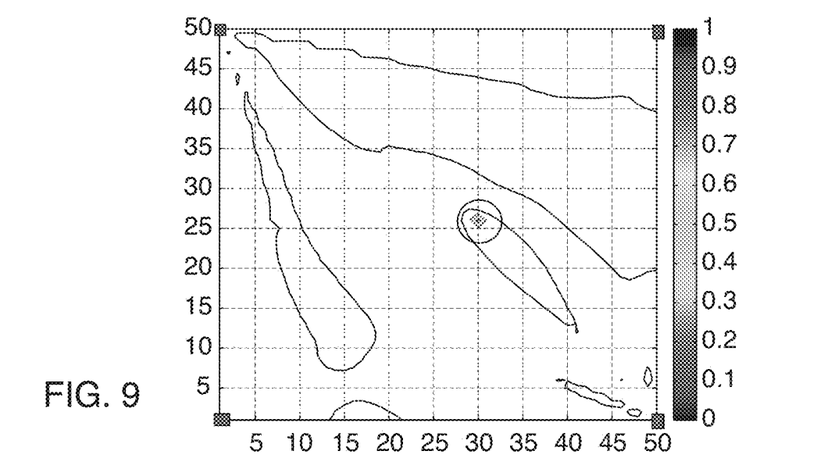
FIG. 9 illustrates a magnitude of correlation coefficient for the data of the user at the location of FIG. 8 that receives the shared secret from four sources, according to certain embodiments.

The magnitude of the correlation coefficient between the received signal and the shared secret for the location of FIG. 8 is illustrated in FIG. 9. As illustrated, the received signal over the whole grid is almost uncorrelated with the shared secret, except for the area around the desired location. Accordingly, the signal received outside the desired location does not have any form of linear relationship with the shared secret message. Notably, compared to the systems with two sources, for example the systems depicted in FIGS. 2-5, the area where the message is decodable becomes much smaller. Accordingly, sources can be added or subtracted to provide a flexible security level based on resources implemented, receiving location size, and the secrecy requirements of each user.

Figure 10:
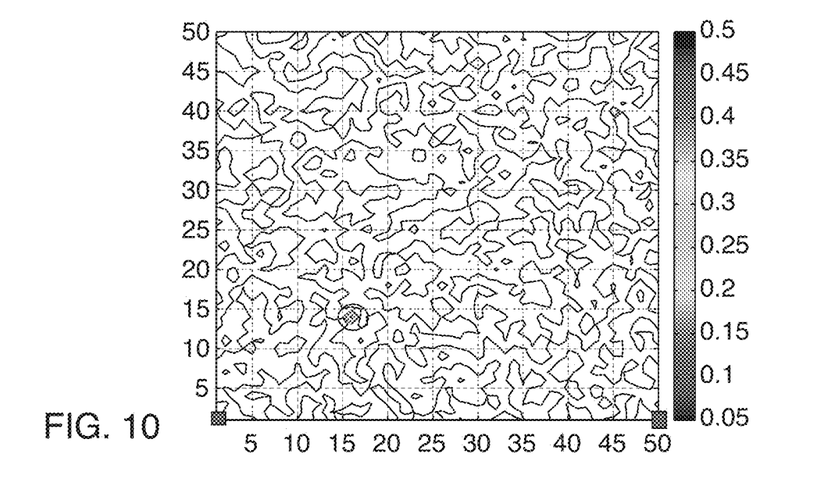
FIG. 10 illustrates a grid showing a bit-error-rate for data of a user at a location that receives a shared secret from two sources, according to certain embodiments.

FIG. 10 illustrates a grid showing a bit-error-rate for data of a user at a location that receives a shared secret from two sources. The effect of including channel precoding, in case of a frequency selective channel, is illustrated in the grid. The data may be transmitted using a collaborative location-based secure communication system similar to the one of FIG. 2. The grid is a 50 by 50 grid with a pair of sources located at the bottom corners of the grid and another pair of sources located at the top corners (depicted as squares) and the receiving user is located at 16,14. The area where the data is decodable is located within the circle, which includes the user within the circle. Notably, the data is decodable in a very limited area around the location of the desired user, while outside that area the received symbols are almost random.

Figure 11:
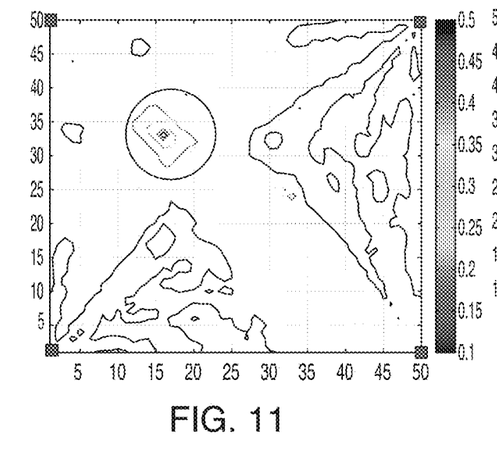
FIG. 11 illustrates a grid showing a bit-error-rate for data of a user at another location that receives a shared secret from two sources, according to certain embodiments.

FIG. 11 illustrates a grid showing a bit-error-rate for data of a user at another location that receives a shared secret from two sources. The system illustrated in FIG. 11 serves a single user. The data may be transmitted using a collaborative location-based secure communication system similar to the one of FIG. 2. The grid is a 50 by 50 grid with a pair of sources located at the bottom corners of the grid and another pair of sources located at the top corners (depicted as blue squares) and the receiving user is located at 16,33. The area where the data is decodable is located within the black circle, which includes the user within the circle. Notably, even though the area of detectability is larger, the system is still able to provide secrecy over the most of the other areas. Accordingly, in some embodiments, the system relies on multiuser interference only.

Figure 12:
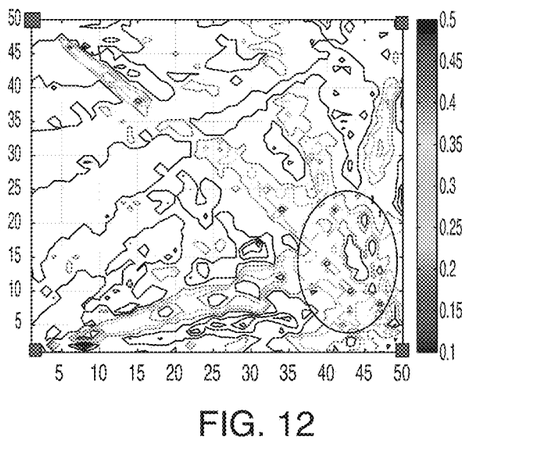
FIG. 12 illustrates a grid showing a bit-error-rate for data of a user at a location that receives a secret from four sources without a shared secret scheme, according to certain embodiments.

Turning to FIG. 12, a grid showing a bit-error-rate for data of a user at a location that receives a shared secret from four sources is illustrated. The grid is a 50 by 50 grid with a pair of sources located at the bottom corners of the grid and another pair of sources located at the top corners (depicted as blue squares) and the receiving user is located at 44,15. However, unlike the other systems, the system of FIG. 12 does not implement a secret sharing scheme. The area where the data is decodable is located within the black circle, which includes the user within the circle. Notably, the data is decodable is much larger than other implementations that apply a secret sharing scheme. Additionally, the lack of a secret sharing scheme results in the locations along the line of sight of the source being all vulnerable.

Figure 13:
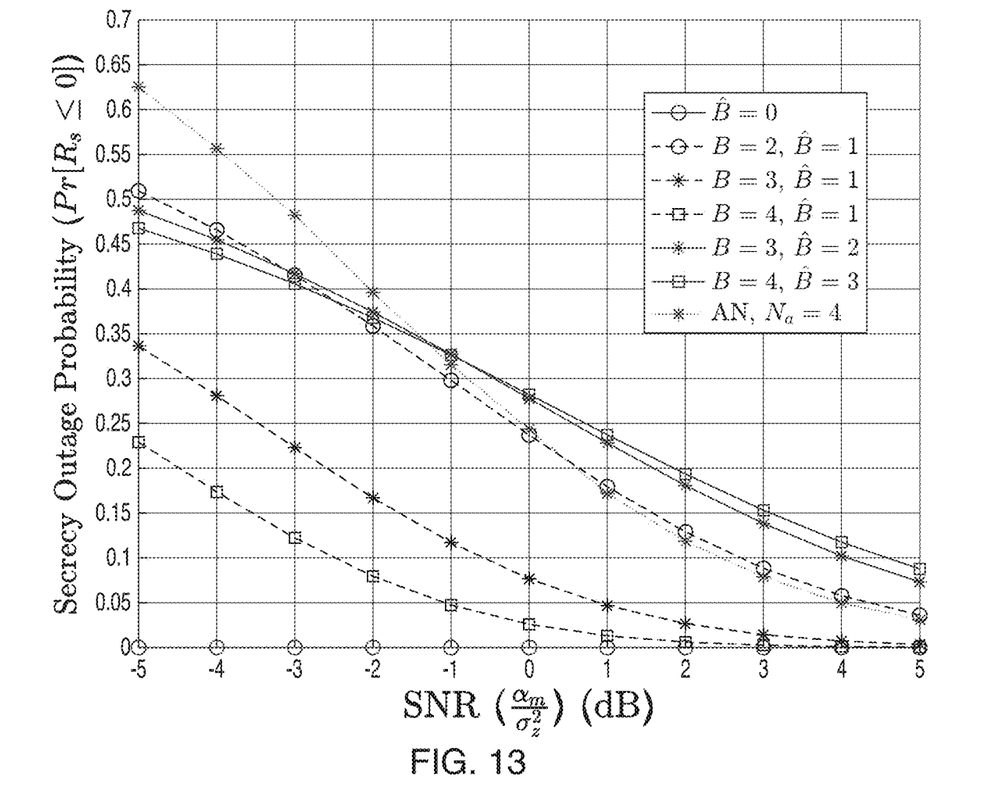
FIG. 13 illustrates a graph of secrecy outage probability of the system for different number of sources and different number of collected shares, according to certain embodiments.

FIG. 13 illustrates a graph of secrecy outage probability of the system for different number of sources (B) and different number of collected shares (B) where the secrecy threshold is $\gamma_{th}=0$. The graph depicts an increase in the number of sources results in the system can achieving a better outage performance. Further, the graph depicts a decrease in the number of detected shares affect the performance significantly. The graph also depicts the comparison between the performance of certain embodiments to the widely adopted AN scheme, which has an underlying assumption of the non-availability of the CSI of the eavesdropper. Notably, certain embodiments outperform the AN scheme while using a fewer number of resources.

Figure 14:
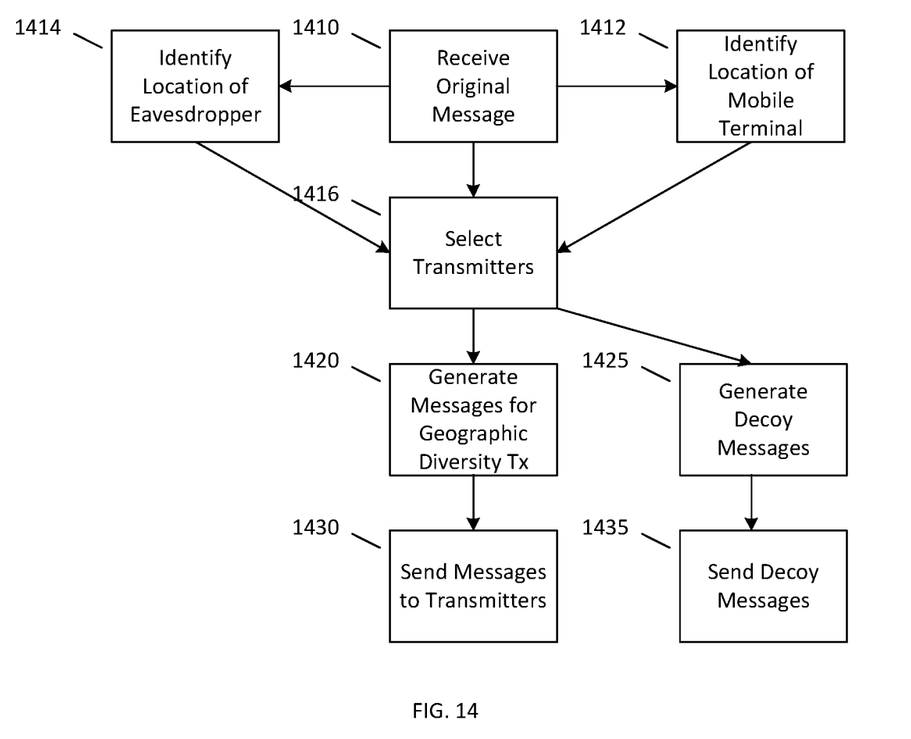
FIG. 14 illustrates a method according to certain embodiments.

FIG. 14 illustrates a method according to certain embodiments. As shown FIG. 14 a method can include, at 1410 receiving, by a controller, an original message for secure delivery to a mobile terminal. The receiving the original message at 1410 can broadly encompass receiving any message from any source, such as a message from a remote terminal, a message generated by the controller itself, such as a control message, or a message generated for, for example, diagnostic purposes by the mobile terminal itself.

The method can also include, at 1420, generating a plurality of messages to be delivered to the mobile terminal using geographic diversity. In this context geographical diversity can refer to using different signal paths, such that an eavesdropper geographically between the mobile terminal and a first transmitter is not also geographically between the mobile terminal and a second transmitter. For example, two elements in a single linear array or two sets of elements in the same linear array would not provide the scale of geographical diversity being considered, even though they could be viewed as providing a small amount of geographical diversity, since an eavesdropper between one part of an array and the mobile terminal would also be between another part of the same array and the mobile terminal. By contrast, two or more different remote radio heads as illustrated, for example, in FIG. 1 may provide an appropriate geographical diversity.

The method can further include, at 1430, sending, by the controller, the plurality of messages to geographically diverse transmitters for transmission to the mobile terminal. For example, the controller may provide the messages via a fiber optic or other secure connection to a plurality of remote radio heads for wireless transmission to the mobile terminal.

Each of the geographically diverse transmitters can be configured to transmit a respective one of the messages using directional modulation. For example, the transmitters can use a narrow beam and power limiting to target the mobile terminal, without transmitting the message to the majority of a coverage area of the transmitter.

The method of FIG. 14 can also include, at 1412, identifying, by the controller, a location of the mobile terminal. The location may be obtained by a reported location provided by the mobile terminal, or by multilateration or similar techniques by receivers collocated with plurality of geographically diverse transmitters. As another alternative, the location of the mobile terminal may be determined in an independent way, such as by a satellite imaging technique. The directional modulation can include sending the message to the identified location of the mobile terminal.

The method of FIG. 14 can further include, at 1414, identifying a location of an eavesdropper or potential eavesdropper. In some cases, the potential eavesdropper may be a passive receiver or otherwise not cooperative with the communication system implementing certain embodiments. Accordingly, the location of the eavesdropper may be determined independent of the communication system, such as by satellite or drone imaging, or according to a plan. For example, law enforcement may identify a building as potentially containing people of interest, and it may be assumed that the people in the building may have access to eavesdropping equipment within the building. Other ways of identifying the actual or potential location of the eavesdropper are also permitted.

The method can also include, at 1416, selecting the geographically diverse transmitters for the transmission to the mobile terminal to avoid transmission by at least one of the geographically diverse transmitters to the eavesdropper. This may be based on the identified location of the eavesdropper(s) in the system, or the approach may be instead designed to minimize such interception by selecting signal transmission paths with a low degree of overlap.

The generating the plurality of messages at 1420 can include generating the plurality of messages to contain a respective portion of the original message. For example, in certain embodiments, N messages can generated, each having 1/N of the message. With this approach, recovery of the message would require receiving all N messages. More generally, the generating can be done in a way that allows reconstruction only from at least a predetermined minimum amount of the plurality of messages. The predetermined minimum could be all messages, or some other number of messages. For example, if the signal environment might experience jamming as well as eavesdropping, the predetermined number may be less than all the message. As described above, the reconstruction can be performed by solving a system of linear equations or by Lagrange interpolation. Other reconstruction techniques are also permitted.

In certain embodiments, the system may, at 1425, generate decoy messages. The decoy messages may be designed to be received by eavesdroppers at the eavesdroppers' location(s) or in general at any location other than that of the mobile terminal. The method can also include, at 1435, sending the plurality of decoy messages to geographically diverse transmitters for transmission away from the mobile terminal. The decoy messages may be configured with random information, useless information, or intentionally misleading information. The use of directional modulation can be used to ensure that the mobile terminal does not receive the decoy messages. In case an eavesdropper receives one of the real messages and one or more of the decoy messages, the eavesdropper may be unable to reconstruct the original message and may either be thwarted from performing any reconstruction, or may reconstruct an inaccurate message.

Figure 15:
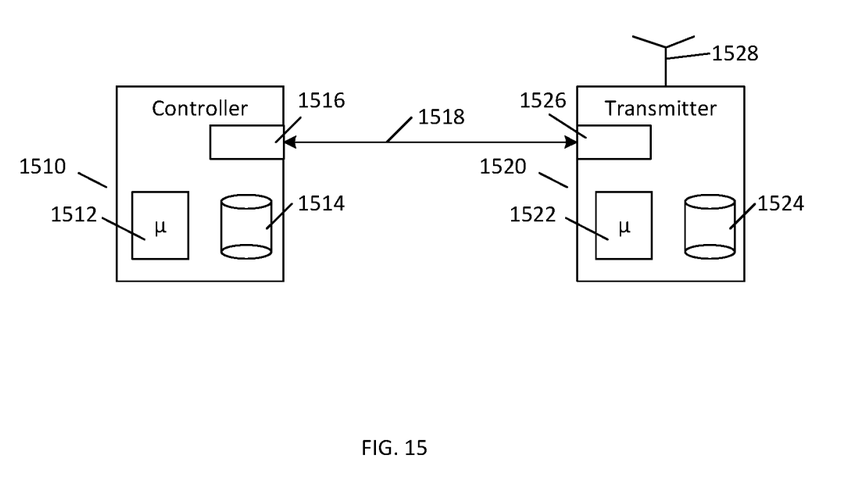
FIG. 15 illustrates a system according to certain embodiments.

FIG. 15 illustrates a system according to certain embodiments. As shown in FIG. 15, a system can include a controller 1510, such as a baseband unit. The system can also include a plurality of transmitters, of which one transmitter 1520 is shown for ease of illustration. The transmitter 1520 may be a remote radio head. The controller 1510 and transmitter 1520 may each include a respective microprocessor (u) 1512, 1522. The microprocessor (u) 1512, 1522 may be any suitable computing device including a central processing unit or application-specific integrated circuit with one or more processing core.

The controller 1510 and transmitter 1520 may each include a respective memory 1514, 1524. The memory 1514, 1524 may be any storage or random access memory (RAM) or combination thereof. For example, storage and RAM may be separately included or only one or the other may be provided. The memory 1514, 1524 may serve as a non-transitory computer-readable medium for encoding a program of instructions to operate the transmitter 1510 and transmitter 1520 respectively.

The controller 1510 and transmitter 1520 may each include a respective communication interface 1516, 1526, such as a network interface card (NIC) or other communications equipment. The communication interface 1516, 1526 may be configured to permit unidirectional or bidirectional communication between the controller 1510 and the transmitter 1526 over a secure medium 1518.

The secure medium 1518 may be a fiber optic cable, a coaxial cable, or a microwave link. In the case of a microwave link, the secure medium 1518 may be secured using a symmetrical encryption algorithm. Such algorithms may also be used with other communication media, to prevent or limit wiretapping.

The transmitter 1520 may include one or more antenna 1528 or array of antenna elements. The antenna 1528 may be configured to be able to form a narrow beam at an intended target.

Although only one transmitter 1520 is shown, multiple transmitters can be included as illustrated, for example, in FIG. 1. For example, a system can include one controller 1510 and two or four transmitters 1520. The transmitters 1520 may be at fixed locations around the perimeter of a region of interest as illustrated in FIGS. 2-12. Other arrangements are also permitted. Optionally, the transmitters 1520 may be relay nodes, which may be mobile terminals. In such a case, the controller 1510 may take into account a current location of the transmitters 1520.

In certain embodiments, the transmitter 1510 may be configured to send messages for law enforcement or military purposes. In such cases, the above approach to securing communication can be combined with other techniques. For example, a message to be secured may be first encoded with a substitution cipher, then applied to an image using steganography, and then the image may be encrypted using AES. Finally, the AES encrypted message may be divided into various parts to be transmitted using geographical diversity, thereby further minimizing the changes of the message being properly received and read.

Various embodiments may rely on software, for example for control of a baseband unit of a centralized radio access network. In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components that, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a remote radio head may also apply to example embodiments that include multiple instances of the remote radio head, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. A controller, comprising:
   at least one processor; and
   at least one memory including computer program code,
   wherein the at least one memory and the computer program code are configured to, with the at least one processor, cause the controller at least to
   receive an original message for secure delivery to a mobile terminal;
   generate a plurality of messages to be delivered to the mobile terminal using geographic diversity;
   send the plurality of messages to geographically diverse transmitters for transmission to the mobile terminal;
   identify a location of the mobile terminal;
   identify a location of an eavesdropper; and
   select the geographically diverse transmitters for the transmission to the mobile terminal to avoid transmission by at least one of the geographically diverse transmitters to the eavesdropper.

2. The controller of claim 1, wherein each of the geographically diverse transmitters is configured to transmit a respective one of the messages using directional modulation.

3. The controller of claim 2, wherein the at least one memory and the computer program code are configured to, with the at least one processor, cause the controller at least to
identify a location of the mobile terminal,
wherein the directional modulation comprises sending the respective one of the messages to the location of the mobile terminal.

4. The controller of claim 1, wherein the generating the plurality of messages comprises generating the plurality of messages to contain a respective portion of the original message.

5. The controller of claim 4, wherein the generating comprises generating the plurality of messages in a way that allows reconstruction only from at least a predetermined minimum amount of the plurality of messages.

6. The controller of claim 5, wherein the reconstruction comprises solving a system of linear equations.

7. The controller of claim 5, wherein the reconstruction comprises Lagrange interpolation.

8. The controller of claim 5, wherein the predetermined minimum amount is all of the plurality of messages.

9. The controller of claim 1, wherein the at least one memory and the computer program code are configured to, with the at least one processor, cause the controller at least to
generate a plurality of decoy messages; and
send the plurality of decoy messages to geographically diverse transmitters for transmission away from the mobile terminal.

10. A method, comprising:
receiving, by a controller, an original message for secure delivery to a mobile terminal;
generating, by the controller, a plurality of messages to be delivered to the mobile terminal using geographic diversity;
sending, by the controller, the plurality of messages to geographically diverse transmitters for transmission to the mobile terminal;
identifying a location of the mobile terminal;
identifying a location of an eavesdropper; and
selecting the geographically diverse transmitters for the transmission to the mobile terminal to avoid transmission by at least one of the geographically diverse transmitters to the eavesdropper.

11. The method of claim 10, wherein each of the geographically diverse transmitters is configured to transmit a respective one of the messages using directional modulation.

12. The method of claim 11, further comprising:
identifying, by the controller, a location of the mobile terminal,
wherein the directional modulation comprises sending the respective one of the messages to the location of the mobile terminal.

13. The method of claim 10, wherein the generating the plurality of messages comprises generating the plurality of messages to contain a respective portion of the original message.

14. The method of claim 13, wherein the generating comprises generating the plurality of messages in a way that allows reconstruction only from at least a predetermined minimum amount of the plurality of messages.

15. The method of claim 14, wherein the reconstruction comprises solving a system of linear equations or wherein the reconstruction comprises Lagrange interpolation.

16. The method of claim 14, wherein the predetermined minimum amount is all of the plurality of messages.

17. The method of claim 10, further comprising:
generating a plurality of decoy messages; and
sending the plurality of decoy messages to geographically diverse transmitters for transmission away from the mobile terminal.

18. A system, comprising:
a controller configured to
receive an original message for secure delivery to a mobile terminal,
generate a plurality of messages to be delivered to the mobile terminal using geographic diversity,
send the plurality of messages to geographically diverse transmitters for transmission to the mobile terminal,
identify a location of the mobile terminal,
identify a location of an eavesdropper, and
select the geographically diverse transmitters for the transmission to the mobile terminal to avoid transmission by at least one of the geographically diverse transmitters to the eavesdropper; and
the geographically diverse transmitters configured to transmit a respective message of the plurality of messages to the mobile terminal.

* * * * *